United States Patent [19]
Imai

[11] Patent Number: 5,294,148
[45] Date of Patent: Mar. 15, 1994

[54] REINFORCEMENT STRUCTURE FOR VEHICLE AIRBAG AND METHOD OF PRODUCING THE SAME

[75] Inventor: Hiroshi Imai, Kanagawa, Japan

[73] Assignee: Ikeda Bussan Co., Ltd., Ayase, Japan

[21] Appl. No.: 919,256

[22] Filed: Jul. 27, 1992

[30] Foreign Application Priority Data

Jul. 29, 1991 [JP] Japan ................ 3-211528

[51] Int. Cl.⁵ .............................. B60R 21/16
[52] U.S. Cl. .................... 280/743 R; 383/107
[58] Field of Search ............ 280/743, 728, 731, 732, 280/729, 743 R, 728 R; 112/440, 441, 162; 2/275, 248; 383/107, 119, 114

[56] References Cited

U.S. PATENT DOCUMENTS

| 664,703 | 12/1900 | Woodward | 383/107 |
|---|---|---|---|
| 1,643,406 | 9/1927 | Finch | 112/265.1 |
| 4,004,827 | 1/1977 | Kondo et al. | 280/729 |
| 4,593,418 | 6/1986 | Simon | 2/275 |
| 5,071,161 | 12/1991 | Mahon et al. | 280/743 |
| 5,094,476 | 3/1992 | Chihaya | 280/743 |
| 5,141,787 | 8/1992 | Yamamoto | 112/441 |

FOREIGN PATENT DOCUMENTS

| 54-69543 | 5/1979 | Japan . |
|---|---|---|
| 56-43890 | 10/1981 | Japan . |
| 61-85549 | 6/1986 | Japan . |
| 2-200548 | 8/1990 | Japan . |

*Primary Examiner*—Karin L. Tyson
*Attorney, Agent, or Firm*—Foley & Lardner

[57] ABSTRACT

A reinforcement structure for an airbag having a band-like main wall and side walls stitched to opposite sides of the main wall, and a method of producing the reinforcement structure are disclosed. The reinforcement structure includes at least one substantially rectangular reinforcing member made of a sheet material and traversing a width of the main wall. First and second stitching rows are formed on the reinforcing member and extend in lateral and longitudinal directions of the main wall, respectively. The first stitching rows each are formed, at both ends thereof, with extensions extending outwardly adjacent the second stitching rows.

5 Claims, 2 Drawing Sheets

5,294,148

REINFORCEMENT STRUCTURE FOR VEHICLE AIRBAG AND METHOD OF PRODUCING THE SAME

BACKGROUND OF THE INVENTION

The present invention relates to improvements in an airbag module for vehicles, and more particularly to a reinforcement structure for an airbag of the airbag module, and a method of producing the reinforcement structure.

Many motor vehicles are equipped with an airbag module for protection of a passenger upon occurrence of accidental collision. Examples of such an airbag module are disclosed in Japanese Patent Application Second Publication No. 56-43890, Japanese Patent Application First Publication No. 2-200548 and Japanese Utility Model Application First Publications Nos. 54-69543 and 61-85549.

The airbag module includes an airbag which is supplied with gas for inflation thereof. As an example, such an airbag may be made of a plurality of segments of a sheet material which are stitched together to form a bag body. One of the segments is provided with a reinforcement structure for attachment of the airbag to a gas generator or a stationary member of a vehicle body. The gas generator is adapted to momentarily generate gas under a predetermined condition so that the airbag is deployed by the gas pressure. The reinforcement structure is constituted by a substantially rectangular reinforcing member which is also made of a sheet material and stitched to a bag body segment in an overlaying relationship. As a result, the reinforcing member has two pairs of rows of stitching which extend along opposite edges thereof to traverse each other at the corners thereof.

In a stitching step of manufacturing such an airbag, when the second pair of the rows of stitching is formed after forming the first pair, a corner portion of the reinforcing member tends to be folded upon itself and sewed thereto. The folded corner portion of the reinforcing member has a reduced strength against mechanical force applied thereto.

An object of the present invention is to provide a vehicle airbag which is readily manufactured without sewing problems such as folding of a corner portion upon itself, and which has sufficient strength against mechanical force applied thereto.

SUMMARY OF THE INVENTION

According to the present invention, there is provided a reinforcement structure for an airbag made of a sheet material and including a band-like main wall and side walls stitched to opposite side edges of the main wall. The reinforcement structure comprises at least one substantially rectangular reinforcing member made of a sheet material and extending across a width of the main wall of the vehicle airbag, first stitching rows formed on the reinforcing member and extending in a lateral direction of the main wall, and second stitching rows formed on the reinforcing member and extending in a longitudinal direction of the main wall. The first stitching rows each are formed at both ends thereof with extensions extending outwardly adjacent the second stitching rows. Further, there is also provided a method of producing a reinforcement structure for an airbag, comprising the following steps in the order named. The steps are: disposing a substantially rectangular sheet material on a band-like main wall of the vehicle airbag, the substantially rectangular sheet material having opposite end edges extending in a lateral direction of the main wall and opposite side edges extending in a longitudinal direction of the main wall; providing first stitching rows which join the substantially rectangular sheet material with the main wall and extend along the opposite end edges of the substantially rectangular sheet material; providing extensions of the first stitching rows extending from both ends of the first stitching rows toward each of the opposite end edges of the substantially rectangular sheet material; and providing second stitching rows which join side walls with the main wall carrying the substantially rectangular sheet material. The second stitching rows pass through the substantially rectangular sheet material so as to extend along the opposite side edges of the substantially rectangular sheet material.

DESCRIPTION OF THE PREFERRED EMBODIMENT

Figure 1:
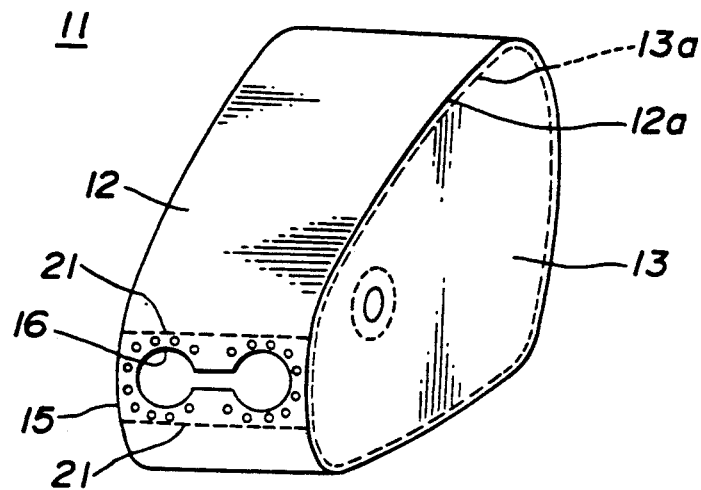
FIG. 1 is a perspective view of an airbag with a reinforcement structure according to the present invention.

Referring now to FIG. 1, there is shown an airbag having a preferred embodiment of a reinforcement structure according to the present invention. The airbag is made of a sheet material such as cloth or the like. As shown in FIG. 1, an airbag 11 includes a looped band-like main wall 12 and side walls 13 disposed on opposite sides of the main wall 12. The main wall 12 has a dumbbell-shaped gas inlet 16 through which gas from a gas generator (not shown) is supplied into the airbag 11. A reinforcement portion 15 is provided around the gas inlet 16 for installation of the airbag 11 to the gas generator or a base plate (not shown) which is secured to a vehicle stationary member such as an instrument panel or a steering wheel.

Figure 2:
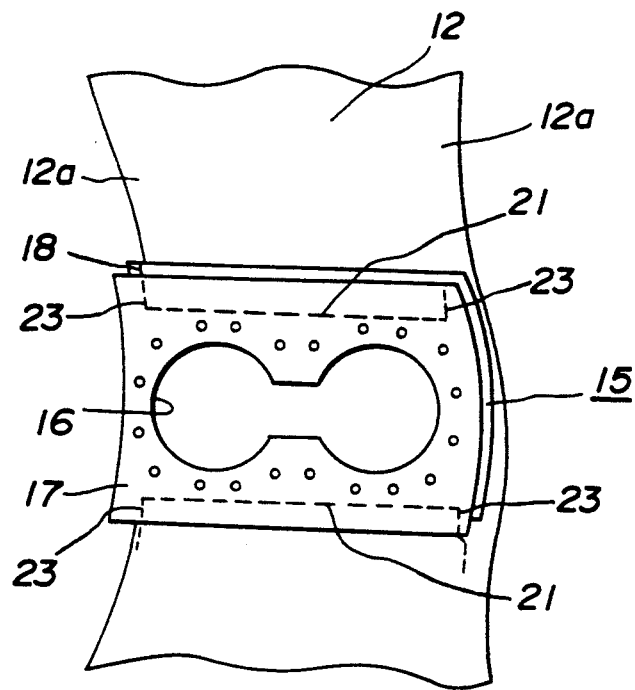
FIG. 2 is a fragmentary perspective view of the reinforcement structure, showing the first stitching row.

The reinforcement portion 15 of the airbag 11 is formed by steps as follows. As shown in FIG. 2, inner and outer reinforcing members 17 and 18 made of sheet materials are in turn overlaid on the reinforcement portion 15 of the main wall 12 so as to extend across a width of the main wall 12. The reinforcing members 17 and 18 have opposite end edges and opposite side edges respectively. The reinforcing member 17 and 18 have apertures which are of substantially the same configuration so as to be aligned with the gas inlet 16 of the main wall 12. The inner reinforcing member 17 may be made of a flame repellent material. Opposite rows of first stitching 21 extend along upper and lower end portions of the overlaying reinforcing members 17 and 18, respectively. The upper and lower stitching rows 21, 21 have at both their ends two pairs of extensions 23, 23 extending outwardly therefrom, substantially parallel with a longitudinal direction of the main wall 12, respectively.

Figure 3:
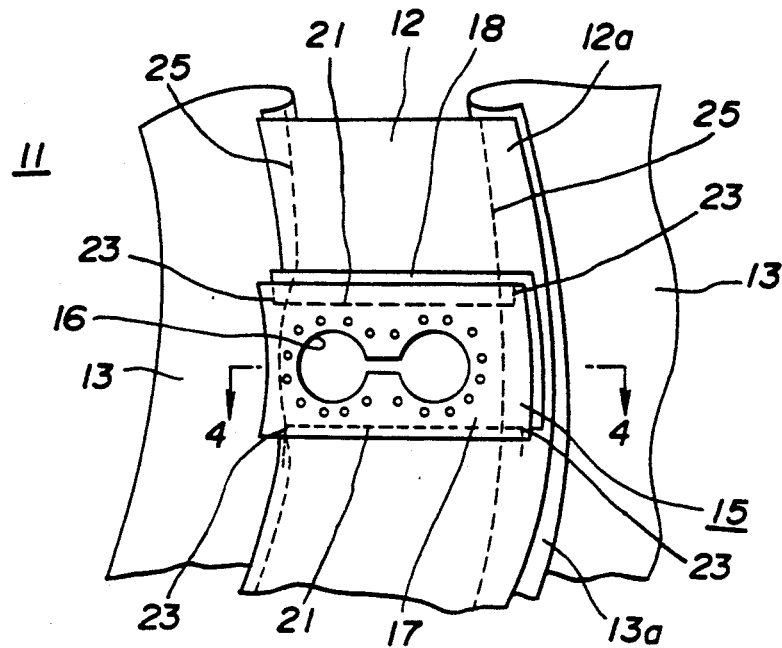
FIG. 3 is a fragmentary perspective view of the reinforcement structure, showing the first and second stitching rows which extend in two directions substantially perpendicular to each other.

Subsequently, as shown in FIG. 3, each of the side walls 13, 13 of the airbag 11 is stitched to the main wall 12 after a side edge 13a of the side wall 13 is substantially aligned with a side edge 12a of the main wall 12. Opposite rows of second stitching 25 are formed on inner peripheries of the overlapped side edges 12a and 13a of the main and side walls 12 and 13. As a result, the second stitching rows 25, 25 extend along, and substantially parallel with, the two pairs of extensions 23, 23 of the first stitcing rows 21, 21. In this step of stitching the side walls 13, 13 to the main wall 12, the provision of the extensions 23, 23 prevents end edges of the reinforcing members 17 and 18 from being stitched in an undesirable state, such as folded back. Moreover, a portion of the extensions 23, 23 may be omitted for the following reason. As is appreciated, when each of the second stitching rows 25 is formed through the reinforcing members 17 and 18, for example from the lower end to the upper end as viewed in FIG. 3, lower end edges of the reinforcing members 17 and 18 are stitched from outside to inside while upper end edges thereof are stitched afterward from inside to outside. Therefore, it would rarely occur that the upper end edges of the reinforcing members 17 and 18 positioned on the downstream side relative to the second stitching rows 25 are undesirably stitched to themselves in a folded-back or turned-over state. In this case, the extensions 23, 23 at the upper end of the reinforcing members 17 and 18 may be omitted. Further, the extensions 23, 23 may be formed on or inside the second stitching rows 25, 25 or traversed outwardly and slantingly relative to the same.

Figure 4:
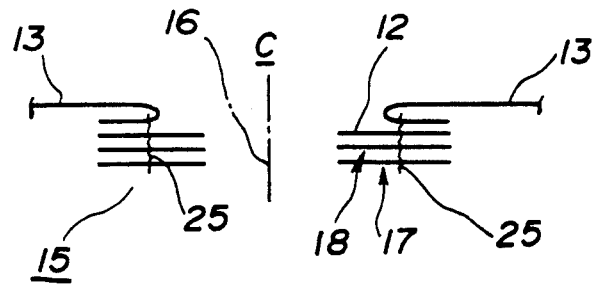
FIG. 4 is a sectional view of the reinforcement structure, taken along the line 4—4 in FIG. 3 and showing the second stitching rows.

Thus, the formation of the second stitching rows 25, 25 allows the main wall 12 to carry the reinforcing members 17 and 18 and the side walls 13, 13 on inner and outer faces thereof, respectively, as viewed in FIG. 4.

Figure 5:
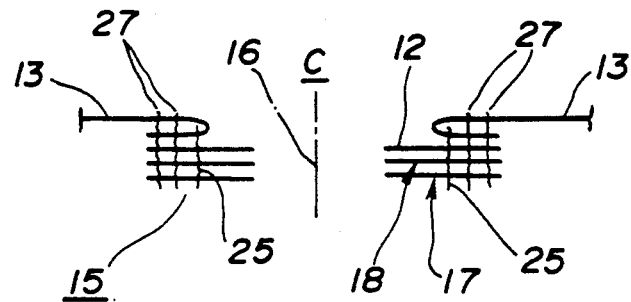
FIG. 5 is a sectional view of the reinforcement structure, showing additional rows of double stitching.

After the formation of the second stitching rows 25, 25, the side walls 13, 13 are folded back outwardly at the second stitching rows 25, 25. Then the folded back portions of the side walls 13, 13 are stitched again, outside the second stitching rows 25, 25, to the main wall 12 together with the reinforcing members 17 and 18 so that rows of double stitching 27 extending along the second stitching rows 25, 25 are formed as viewed in FIG. 5. The double stitching rows 27 are made of chain stitches, respectively. Single stitching may be substituted for the double stitching 27.

What is claimed is:

1. A reinforcement structure for an airbag made of a sheet material and including a band-shaped main wall and side walls, comprising:
   at least one substantially rectangular reinforcing member made of a sheet material and extending across a width of the main wall of the airbag, said reinforcing member having opposite end edges extending in a lateral direction of said main wall and opposite side edges extending in a longitudinal direction of said main wall;
   first stitching rows formed on said reinforcing member and extending along the opposite end edges of said reinforcing member to join said reinforcing member with said main wall;
   second stitching rows formed adjacent both ends of each of said first stitching rows on said reinforcing member and extending along the opposite side edges of said reinforcing member so as to join said main wall with said reinforcing member and with said side walls; and
   fold-back preventing stitching rows extending outwardly from said both ends of said first stitching rows to thereby prevent the end edges of said reinforcing member from being folded back when said second stitching rows are formed.

2. A reinforcement structure as claimed in claim 1, wherein said reinforcing member is made of a plurality of sheet materials.

3. A reinforcement structure as claimed in claim 2, wherein said plurality of sheet materials include an innermost sheet material made of a flame repellent material.

4. A reinforcement structure as claimed in claim 1, wherein said fold-back preventing stitching rows include extensions of said first stitching rows.

5. A method of producing a reinforcement structure for an airbag including a band-shaped main wall and side walls, comprising the following steps in the order named:
   disposing a substantially rectangular sheet material on the main wall of the airbag, said substantially rectangular sheet material having opposite end edges extending in a lateral direction of the main wall and opposite side edges extending in a longitudinal direction of the main wall;
   providing first stitching rows which join the substantially rectangular sheet material with the main wall and extend along the opposite end edges of the substantially rectangular sheet material;
   providing fold-back preventing stitching rows extending outwardly from both ends of said first stitching rows to thereby prevent the end edges of the substantially rectangular sheet material from being folded back in the subsequent step of providing second stitching rows; and
   providing second stitching rows which are disposed adjacent both ends of each of said first stitching rows on the substantially rectangular sheet material and extend along the opposite side edges of the substantially rectangular sheet material so as to join the side walls with the main wall carrying the substantially rectangular sheet material.

* * * * *